L. A. KLING.
GONG.
APPLICATION FILED FEB. 24, 1912.
1,148,326.
Patented July 27, 1915.
2 SHEETS—SHEET 1.
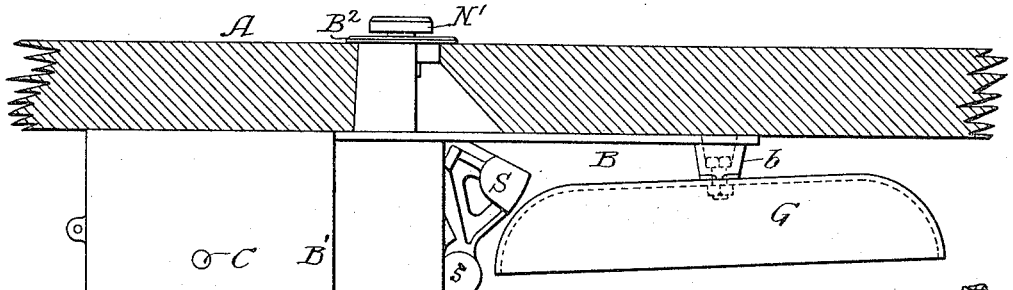
Fig. 1.
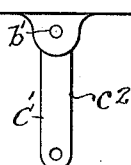
Fig. 2.
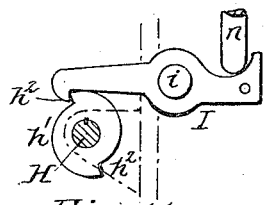
Fig. 11.
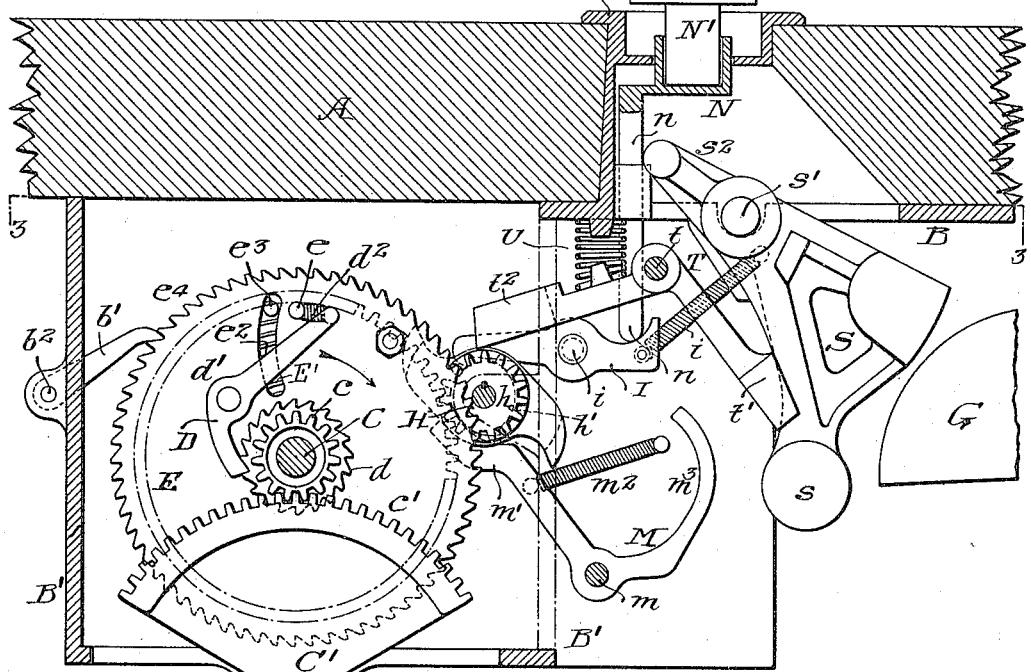
Fig. 6.
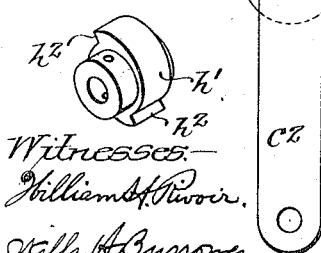
Witnesses
William A. Rivoir
Nills A. Burrows
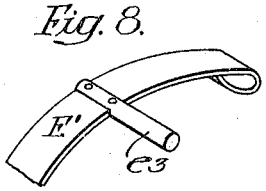
Fig. 8.
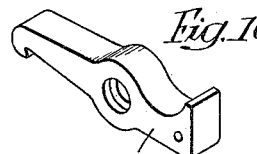
Fig. 10.
Inventor
Louis A. Kling.
by his Attorneys.

L. A. KLING.
GONG.
APPLICATION FILED FEB. 24, 1912.
1,148,326.
Patented July 27, 1915.
2 SHEETS—SHEET 2.
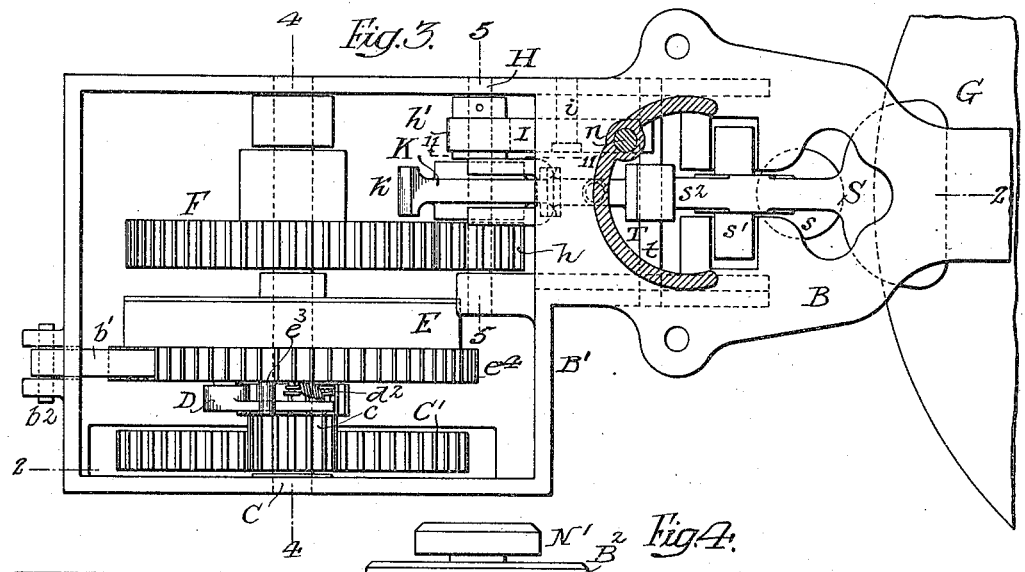
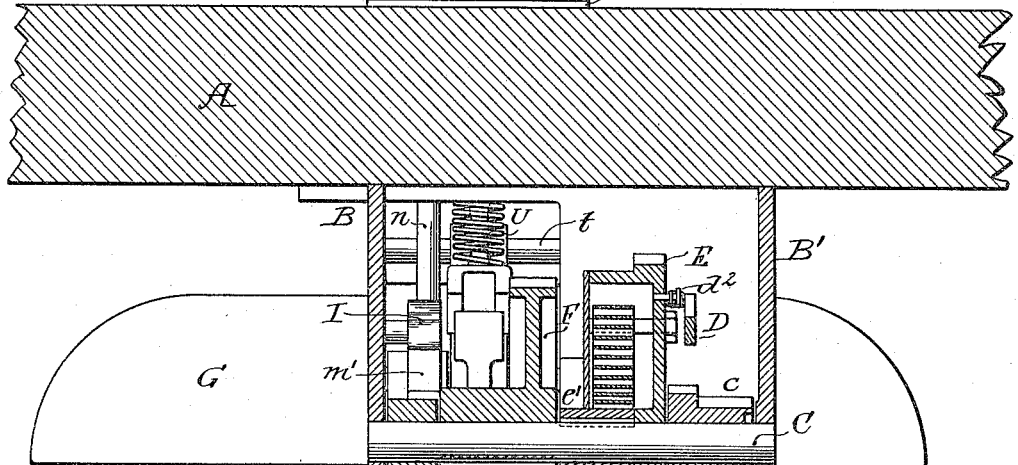
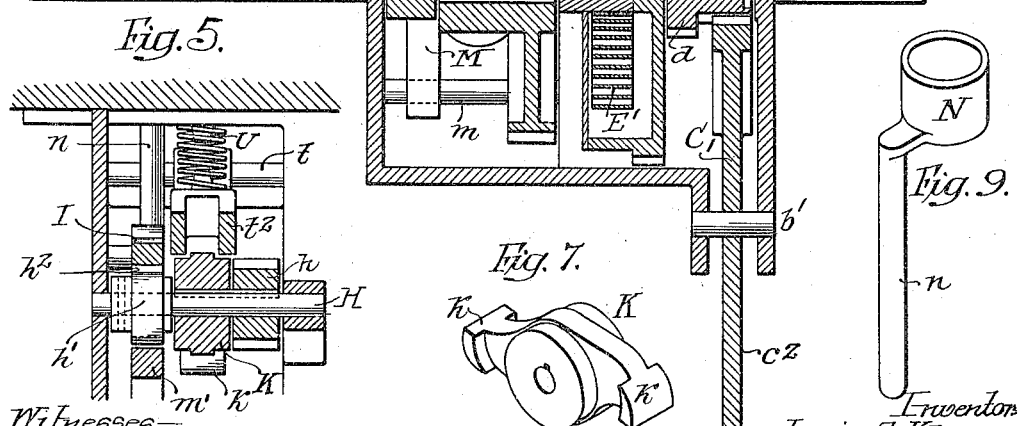
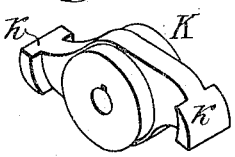
Inventor
Louis A. Kling.
by his Attorneys

UNITED STATES PATENT OFFICE.

LOUIS A. KLING, OF ELIZABETH, NEW JERSEY, ASSIGNOR TO THE J. G. BRILL COMPANY, OF PHILADELPHIA, PENNSYLVANIA, A CORPORATION OF PENNSYLVANIA.

GONG.

1,148,326.  Specification of Letters Patent.  Patented July 27, 1915.

Application filed February 24, 1912. Serial No. 679,540.

*To all whom it may concern:*

Be it known that I, LOUIS A. KLING, a citizen of the United States, residing in Elizabeth, county of Union, State of New Jersey, have invented certain Improvements in Gongs, of which the following is a specification.

My invention relates to certain improvements in automatic gongs for use in street cars and other vehicles in order to sound an alarm.

The object of the invention is to so construct the gong that it will automatically ring for a given length of time; the spring being automatically wound from the brake mechanism or other operating mechanism on the car or vehicle.

In the accompanying drawings:—Figure 1, is a side view of my improved gong, the platform of the car being in section; Fig. 2, is an enlarged sectional view on the line 2—2, Fig. 3; Fig. 3, is a sectional plan view on the line 3—3, Fig. 2; Fig. 4, is a transverse sectional view on the line 4—4, Fig. 3; Fig. 5, is a transverse sectional view on the line 5—5, Fig. 3; Fig. 6, is a detached perspective view of the ratchet wheel; Fig. 7, is a detached perspective view of the cam; Fig. 8, is a detached perspective view of a portion of the actuating spring; Fig. 9, is a perspective view of the plunger; Fig. 10, is a perspective view of the pivoted dog; and Fig. 11, is a sectional view on the line 11—11, Fig. 3.

A is a platform, and secured to the underside of the platform is a frame B forming a casing B' for the mechanism, and having a post $b$ to which the bell or gong G is secured. Mounted in the casing B' is a shaft C, and loosely mounted on this shaft is a pinion $c$ which meshes with a segment $c'$ of a lever C' pivoted at $b'$ to the casing B'. The arm $c^2$ of the lever C' is connected to the brake mechanism of the car for the purpose fully described hereafter. On the hub of the pinion $c$ is a ratchet wheel $d$ with which engages the short arm of a pawl D pivoted at $d'$ to the casing E inclosing the spring E'. The long arm of the pawl D is attached to a pin $e$ on the casing through a spring $d^2$, so that the casing E is free to move in the direction of its arrow, the pawl slipping past the ratchet teeth, but when the ratchet wheel is turned by means of the lever C' it will turn the casing E and wind the spring. One end of the spring is attached to the outer end of the casing, while the other end is attached to a hub $e'$ keyed to the shaft so that the shaft is rotated by the action of the spring.

In order to prevent the breaking of the spring by overwinding, in the event of the bell not being used under normal conditions, I slot the casing E and $e^2$ and secure a pin $e^3$ on one of the coils of the spring, in the manner shown in Fig. 8, so that when the spring is wound to a certain point, the pin $e^3$ will be drawn toward the center of rotation and will automatically press upon the long arm of the pawl D and force it out of engagement with the ratchet, so that the ratchet wheel is free to rotate without winding the spring beyond a certain point.

On the periphery of the casing E are ratchet teeth $e^4$ which engage the pawl $b'$ pivoted at $b^2$ to the casing B', so that while the casing E can move in the direction of its arrow, it is prevented from moving in the opposite direction by the pawl $b'$.

Secured to the shaft C is a gear wheel F. This gear wheel meshes with a pinion $h$ on the shaft H mounted in bearings in the casing B', and secured to the shaft H is a ratchet $h'$ having shoulders $h^2$ with which engage the ends of the dog I which is pivoted at $i$ to the casing. This dog is held in engagement by a spring $i'$ and is forced out of engagement by the projection $n$ on the plunger N mounted in the extension B² of the casing, as clearly shown in Fig. 2, and this frame is forced down by the pin N', which is detachably mounted in a socket in the plunger.

Pivoted at $m$ to the casing B' is a lever M. The arm $m'$ of this lever rests against the ratchet and is held in contact therewith by the coiled spring $m^2$. The arm $m^3$ of the lever M is so shaped as to be struck by the clapper $s$ on its rebound, as fully described hereafter. The striker S is pivoted at $s'$ to the casing, and there is an arm $s^2$ with which the plunger N comes in contact when a single stroke is given to the striker. In this event the striker is actuated directly by the plunger. This method of operating the gong may be used should the automatic mechanism become inoperative. When the plunger is pushed down and held for the purpose of giving one or a series of strokes, then the clapper is actuated by a lever T pivoted at $t$ to the casing; the arm $t'$ of the said lever bearing against the back of the striker S, while the arm $t^2$ extends over a cam K having two arms $k$, $k$ in the present instance. This cam is secured to the shaft H, which is geared to the shaft C. A spring U is mounted between the arms $t^2$ and the underside of the frame B, as clearly illustrated in Fig. 2, and this spring tends to force the arm $t^2$ toward the hub K, and to force the arm $t'$ against the striker S.

The operation of the gong is as follows: As above described, the level C' is attached to the brake mechanism or other moving mechanism of the car, or specially designed mechanism, so that on the actuation of the lever it will wind the spring. The overwinding of the spring is prevented, as above described, by the pin $e^3$ coming in contact with the pawl D which is automatically thrown out of engagement, so as to disconnect the lever and the spring casing. The pawl $b'$ holds the casing E against rotation which would cause the unwinding of the spring, and consequently, in order to unwind the spring, the shaft C must rotate.

When it is wished to strike one blow on the gong independent of the ringing device, then the foot pin N' is pressed down so that the plunger will contact with the arm $s^2$ of the striker S, causing the clapper $s$ to contact with the edge of the gong G, but if it is desired to cause the clapper to strike one or a series of blows on the gong by means of the operating device, then the pin N' is forced down and held, causing the extension $n$ of the plunger N to actuate the dog I, forcing it out of engagement with the shoulder $h^2$ on the cam $h'$ and this immediately releases the shaft H, so that it will turn by the action of the spring, through the gears $h$ and F, and, as the shaft rotates, the arm $k$ on the hub K presses the arm $t^2$ of the lever T against the pressure of the spring U and when the lever is released, the spring forces the arm $t'$ against the striker S which is driven forward, causing the clapper $s$ to strike the blow. On the recoil of the striker the clapper contacts with the arm $m^3$ of the lever M, which in the meantime had stopped the rotation of the shaft H, owing to its arm $m'$ engaging the shoulder $h^2$ on the cam $h'$ and this recoil throws the arm out of engagement again and the shaft is again set in motion, and the arm $k$ again strikes the lever T which in turn operates the striker S, causing the clapper to repeat the blows on the gong as long as the foot is pressed upon the pin N', but as soon as the foot is released from the pin, the spring $i$ raises the plunger N and forces the dog I into engagement with the shoulder $h^2$ on the cam H, stopping the rotation of the shaft and, consequently, the movement of the other parts of the mechanism. Therefore, it will be seen that by the above construction the motorman, or other driver of the vehicle, can either strike a single blow on the gong or cause the mechanism to strike one or a series of blows at will.

I claim:—

1. The combination of a gong; a spring; means for winding the spring; a holder to prevent unwinding of the spring; a plunger actuated by the operator; a striker having an arm with which the plunger can come in direct contact to cause it to strike a blow on the gong; and mechanism connected to the spring for causing the striker to strike one or a series of blows on the gong, said mechanism being also released by the plunger.

2. The combination of a casing; a shaft mounted in the casing; a spring casing on the shaft; a spring therein; a pinion loose on the shaft; mechanism for turning the pinion; a ratchet wheel on the pinion; a dog pivoted to the spring casing and engaging the teeth of the ratchet wheel, one arm of said dog being yieldingly connected to the casing; ratchet teeth on the spring casing; a pawl pivoted to the fixed casing; a hub secured to the shaft and to which one end of the spring is attached; a gear wheel on the shaft, a shaft having a pinion meshing with the said gear wheel; arms on the last mentioned shaft; a ratchet on the last mentioned shaft; a lever actuated by the arms of the shaft; a dog engaging the ratchet and preventing the rotation of both shafts; a pivoted striker actuated by the lever; a plunger arranged to actuate the dog to release the shaft; and a gong.

3. The combination of a shaft; spring mechanism for turning the shaft in one direction; a second shaft geared to the first mentioned shaft and having arms thereon; a ratchet also on the latter shaft; a lever actuated by the arms; a pivoted striker actuated by the lever; a spring mounted between one arm of the lever and the casing; a pivoted dog engaging the shoulders on the ratchet; a spring for retaining the dog in position; a plunger for actuating the dog to release the ratchet shaft and allowing it to turn; and a gong arranged in the path of the striker.

4. The combination of a shaft; spring mechanism for turning the shaft in one direction; a second shaft geared to the first mentioned shaft and having arms thereon; a ratchet also on the latter shaft; a lever actuated by the arms; a pivoted striker actuated by the lever; a spring mounted between one arm of the lever and the casing; a pivoted dog engaging the shoulders on the ratchet; a spring for retaining the dog in position; a plunger for actuating the dog to release the ratchet shaft and allow it to turn; a gong arranged in the path of the striker;

a second lever having an arm in the path of the ratchet arranged to engage said ratchet; and a spring retaining the lever in engagement therewith, said lever having an arm in the path of the striker so that on the rebound of the striker it will contact with the arm and release the ratchet shaft.

In testimony whereof, I have signed my name to this specification, in the presence of two subscribing witnesses.

LOUIS A. KLING.

Witnesses:
HENRY C. ESLING,
H. F. MCKILLIP.

Copies of this patent may be obtained for five cents each, by addressing the "Commissioner of Patents, Washington, D. C."